United States Patent Office.

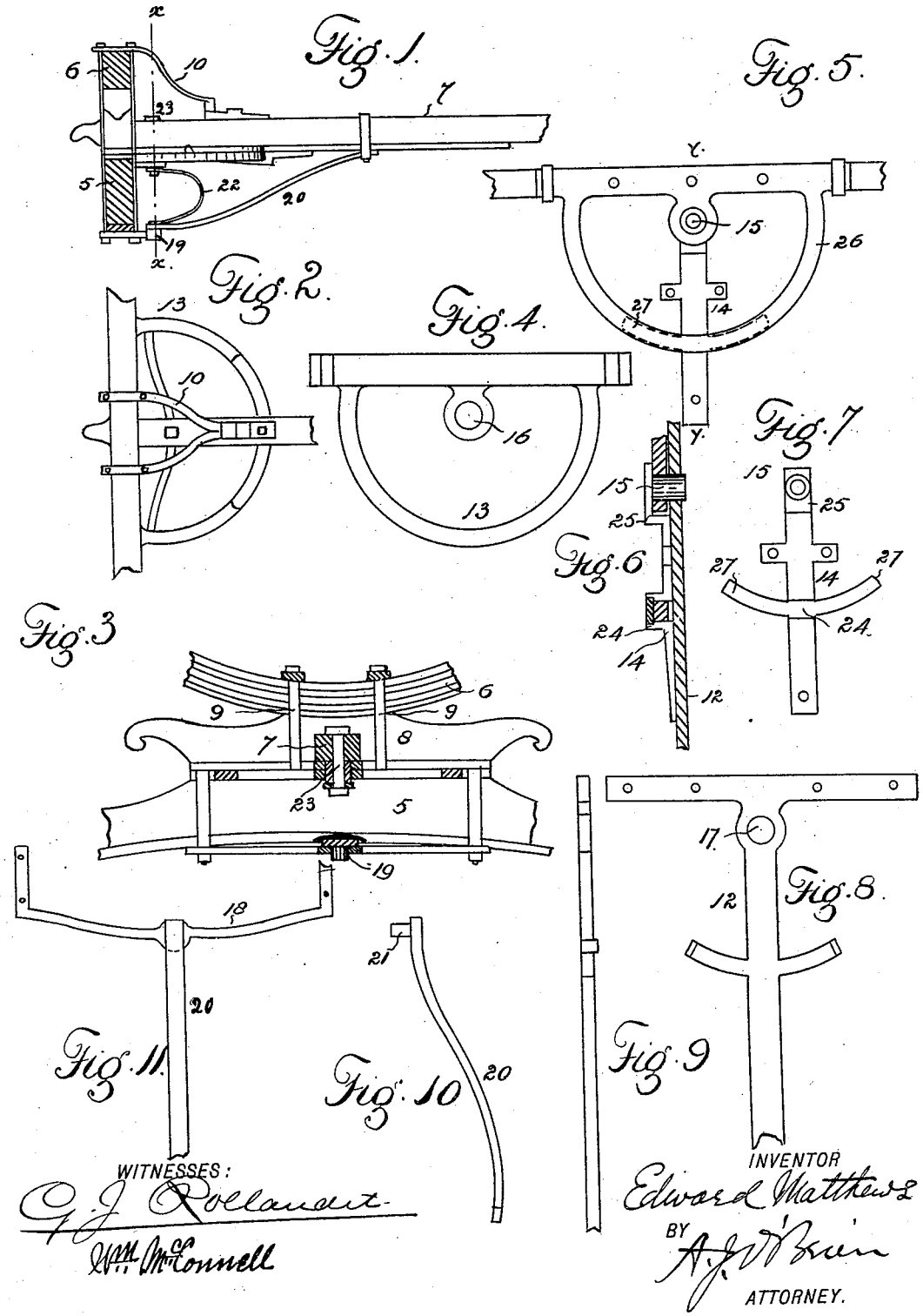

EDWARD MATTHEWS, OF DENVER, COLORADO, ASSIGNOR OF ONE-HALF TO CHARLES N. BROOKS, OF SAME PLACE.

VEHICLE-COUPLING.

SPECIFICATION forming part of Letters Patent No. 489,437, dated January 3, 1893.

Application filed March 16, 1892. Serial No. 425,204. (No model.)

*To all whom it may concern:*

Be it known that I, EDWARD MATTHEWS, a citizen of the United States of America, residing at Denver, in the county of Arapahoe and State of Colorado, have invented certain new and useful Improvements in Vehicle-Couplings; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in vehicle couplings and the object of the improvement is to do away with the king bolt in making the coupling whereby I attain increased strength, durability and general efficiency, the construction being at the same time simple, economical and thoroughly practicable.

To these ends the invention consists of the features, arrangements and combinations hereinafter described and claimed.

The device will be fully understood by reference to the accompanying drawings in which is illustrated an embodiment of the invention.

In the drawings, Figure 1 is a side elevation of the coupling, the parts being assembled; the spring and axle being shown in cross section. Fig. 2 is a top or plan view of the same. Fig. 3 is a vertical cross section taken on line $x$—$x$ Fig. 1. Fig. 4 is a top or plan view in detail of the fifth wheel. Fig. 5 is a similar view of the fifth wheel and safety coupling brace connected. Fig. 6 is a section taken through the fifth wheel and head plate showing the coupling brace in position and partially in section. Fig. 7 is a plan view in detail of the safety coupling brace. Fig. 8 is a similar view of the head plate. Fig. 9 is a side view of the same. Fig. 10 is a detail view of a brace leading from the axle to a socket iron clipped to the under side of the axle. Fig. 11 is a top view of the brace and socket iron connected.

Similar reference characters indicating corresponding parts or elements in the several views, let the numeral 5 designate the axle, 6 the spring, 7 the reach, 8 the head block secured to the spring by clips 9; 10 a bifurcated brace secured to the reach at one extremity and to the spring at the opposite extremity; 12 the head plate secured to the reach and the head block; 13 the fifth wheel suitably secured to the axle; 14 the safety coupling brace secured to the head plate and provided with an upwardly projecting lug 15 which enters sockets 16 and 17 formed in the fifth-wheel-plate and the head plate respectively in the rear of the axle; 18 a branched socket iron clipped to the under side of the axle and provided with a central aperture 19; 20 a brace secured to the under surface of the reach at one extremity and provided with a depending lug 21 at the opposite extremity, said lug entering socket 19; and 22 an anti-rattling spring located between the coupling brace 14 and the brace 20. This spring is bow-shaped and secured to brace 14 by a bolt 23 passing through the reach and lug 15 which is hollow, and an aperture in the extremity of the spring, being secured in place by a nut underneath. The lower extremity of the spring is convex on its under surface and simply bears against the brace 20 above lug 21, thus holding the brace securely in position and preventing any noise or rattling of the parts resulting from the concussions or jars to which vehicles are subjected.

The coupling brace 14 is securely bolted to the head plate 12 and depressed out of a plane at two points 24 and 25 to receive the arc-shaped part 26 and the rear socket 16 respectively of the fifth-wheel. Brace 14 is also provided with wings 27 lying in the same plane with part 24 and forming a bearing for the under surface of the fifth-wheel, these wings being correspondingly curved. This coupling brace 14 maintains the movable fifth-wheel and the stationary head plate in suitable contact and operative relation, the socket 16 turning freely on the lug 15 which forms the axis of the fifth-wheel and in connection with the depending lug 21 of brace 20, completes the coupling and takes the place of the king bolt in other constructions. It will thus be seen that this construction has important advantages over those couplings where the king bolt is employed, since in my improvement the ordinary openings in the axle and head block are dispensed with, giving these parts greatly increased strength with a given weight and quality of material, while the coupling being formed farther in the rear, permits the making of a shorter turn than can be accomplished with the old king-bolt constructions. I also claim for my improvement increased durability and less liability to get out of repair as compared with other couplings.

Having thus described my invention what I claim is:—

1. In a vehicle coupling the combination with the reach, head block, and axle, of the fifth wheel provided with a socket in the rear of the axle, the head plate having a socket correspondingly located, the coupling brace secured to the reach and having a forward upwardly projecting hollow lug engaging the socket in the fifth wheel and head plate, its rear part being depressed out of a plane to receive the fifth wheel and fashioned to form a suitable bearing therefor and a bolt passing through the reach and the hollow lug of the coupling bar and maintaining the parts connected in suitable operative relation, substantially as described.

2. In a vehicle coupling the combination with the axle, head block and reach, of the fifth-wheel provided with the apertured lug located in the rear of the axle, the head plate secured to the reach and head block and provided with an aperture located in the rear of the head block, the coupling brace secured to the reach and provided with a lug engaging the rearward apertures in the fifth-wheel and head plate, said coupling brace maintaining said parts in suitable operative relation, a socket iron secured to the lower surface of the axle, a brace 20 secured to the reach at one extremity and provided with a depending lug, a central aperture in the socket iron at the opposite extremity and an anti-rattling spring bolted to the coupling brace at one extremity and bearing against the brace 20 at the opposite extremity, substantially as described.

In testimony whereof I affix my signature in presence of two witnesses.

EDWARD MATTHEWS.

Witnesses:
C. N. BROOKS,
WM. MCCONNELL.